US012781810B2

(12) United States Patent
Iraschko

(10) Patent No.: US 12,781,810 B2
(45) Date of Patent: Nov. 3, 2026

(54) DISC BRAKE WITH A SYNCHRONIZATION MECHANISM

(71) Applicant: KNORR-BREMSE Systeme fuer Nutzfahrzeuge GmbH, Munich (DE)

(72) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 416 days.

(21) Appl. No.: 18/699,941

(22) PCT Filed: Oct. 5, 2022

(86) PCT No.: PCT/EP2022/077638
§ 371 (c)(1),
(2) Date: Apr. 10, 2024

(87) PCT Pub. No.: WO2023/061815
PCT Pub. Date: Apr. 20, 2023

(65) Prior Publication Data

US 2024/0401658 A1 Dec. 5, 2024

(30) Foreign Application Priority Data

Oct. 11, 2021 (DE) ..................... 10 2021 126 280.1

(51) Int. Cl.
*F16D 55/2255* (2006.01)
*F16D 65/00* (2006.01)
(Continued)

(52) U.S. Cl.
CPC ..... *F16D 55/2255* (2013.01); *F16D 65/0068* (2013.01); *F16D 65/183* (2013.01); *F16D 65/568* (2013.01); *F16D 2055/0016* (2013.01)

(58) Field of Classification Search
CPC ............... F16D 55/225; F16D 55/2255; F16D 2055/0016; F16D 2055/0037; F16D 65/0068; F16D 65/183; F16D 65/40–568
See application file for complete search history.

(56) References Cited

U.S. PATENT DOCUMENTS

2002/0017436 A1 2/2002 Ortegren et al.
2004/0026181 A1 2/2004 Baumgartner et al.
(Continued)

FOREIGN PATENT DOCUMENTS

DE 36 10 569 A1 10/1987
DE 40 32 886 A1 4/1992
(Continued)

OTHER PUBLICATIONS

International Search Report (PCT/ISA/210) issued in PCT Application No. PCT/EP2022/077638 dated Feb. 20, 2023 (2 pages).
(Continued)

*Primary Examiner* — David R Morris
(74) *Attorney, Agent, or Firm* — Crowell & Moring LLP

(57) ABSTRACT

A disc brake, for a motor vehicle, has a brake caliper with a clamping section, which is equipped with a clamping device with a brake rotary lever, at least two threaded pistons, an adjustment device, and a driver device. A synchronization mechanism for synchronizing the rotational movements of the threaded pistons is arranged outside of the housing of the brake caliper within a sealed cover on the clamping section of the brake caliper. The synchronization mechanism has at least one synchronizing element and two synchronizing wheels, a first synchronizing wheel of which is coupled to one threaded piston and a second synchronizing wheel of which is coupled to the other threaded piston. The synchronization mechanism is arranged on the clamping section of the brake caliper (3) so as to be guided about a
(Continued)

lever housing of the brake rotary lever. The lever housing protrudes from the clamping section of the brake caliper.

15 Claims, 10 Drawing Sheets

(51) Int. Cl.

| | |
|---|---|
| ***F16D 65/18*** | (2006.01) |
| ***F16D 65/56*** | (2006.01) |
| *F16D 55/00* | (2006.01) |

(56) References Cited

U.S. PATENT DOCUMENTS

| | | | | |
|---|---|---|---|---|
| 2007/0158145 | A1 | 7/2007 | Bieker et al. | |
| 2007/0209890 | A1 | 9/2007 | Iraschko | |
| 2008/0156593 | A1 | 7/2008 | Severinsson et al. | |
| 2016/0032996 | A1* | 2/2016 | Baumgartner .......... | F16D 65/66 188/71.9 |
| 2016/0327109 | A1 | 11/2016 | Staahl et al. | |
| 2019/0242449 | A1 | 8/2019 | Berwanger | |
| 2020/0393009 | A1 | 12/2020 | Jungmann et al. | |
| 2024/0318698 | A1* | 9/2024 | Schaufelberger ..... | F16D 65/183 |

FOREIGN PATENT DOCUMENTS

| | | | | |
|---|---|---|---|---|
| DE | 101 39 910 | A1 | 7/2004 | |
| DE | 103 00 013 | A1 | 7/2004 | |
| DE | 10 2004 037 771 | A1 | 3/2006 | |
| DE | 10 2012 003 103 | A1 | 8/2013 | |
| DE | 10 2012 108 689 | A1 | 5/2014 | |
| DE | 10 2013 103 346 | A1 | 10/2014 | |
| DE | 10 2015 115 856 | A1 | 3/2017 | |
| EP | 0 566 008 | A1 | 10/1993 | |
| EP | 3 112 718 | A1 | 1/2017 | |
| EP | 3 751 167 | A1 | 12/2020 | |
| WO | WO 2014/041155 | A1 | 3/2014 | |
| WO | WO 2015/107135 | A1 | 7/2015 | |
| WO | WO-2023052304 | A1 * | 4/2023 | ......... F16D 55/2255 |

OTHER PUBLICATIONS

German-language Written Opinion (PCT/ISA/237) issued in PCT Application No. PCT/EP2022/077638 dated Feb. 20, 2023 with English translation (9 pages).

German-language Search Report issued in German Application No. 10 2021 126 280.1 dated May 23, 2022 with partial English translation (11 pages).

Cover Page of EP2 895 760 A1 published Jul. 22, 2015 (1 page).

Cover Page of EP 3 097 319 A1 published Nov. 30, 2016 (1 page).

* cited by examiner

DISC BRAKE WITH A SYNCHRONIZATION MECHANISM

BACKGROUND AND SUMMARY

The invention relates to a disc brake with a synchronization mechanism, in particular for a motor vehicle.

Vehicles and certain technical devices often use friction brakes to convert kinetic energy. Disc brakes are preferred, especially in passenger cars and commercial vehicles.

A typical design of a disc brake from the prior art is shown in FIG. 1 in a schematic partial sectional view. Conventional embodiment variants are shown in schematic perspective views in FIGS. 2 and 3. FIGS. 4 and 5 show schematic views of conventional synchronization mechanisms of conventional disc brakes 1.

The disc brake 1 comprises a brake disc 2 with a brake disc axis 2*a*, a brake caliper 3 together with an internal mechanism and, as a rule, two brake pads 4, 5. The cylinder forces are applied to the inner mechanism via a brake cylinder 17, which is pneumatically actuated for example, amplified by an eccentric mechanism and transmitted as a clamping force to a clamping device via threaded spindles, which are transmitted to the brake pads and brake disc, wherein the wear of brake disc 2 and brake pads 4, 5 is compensated for via the threaded pistons 7, 8, which are also called threaded spindles.

The threaded pistons 7, 8 are usually coupled to each other by a synchronization mechanism 12 (synchronization device) for uniform adjustment of wear. In pneumatically actuated disc brakes, the brake caliper 3 is usually designed as a sliding caliper, swivel caliper or fixed caliper. In the brake caliper 3, the clamping device is arranged in a clamping section 3*a* and serves to bring the brake pads 4, 5 on both sides of the brake disc 2 and the brake disc 2 into operative connection with each other in order to achieve a braking effect through friction.

The clamping device has a brake rotary lever 11, which has an eccentric attachment at its lower end, which is rotatably mounted in the clamping section 3*a* of the brake caliper 3 via a first pivot bearing and which is supported via a support roller on a cross-member 6, into which the threaded pistons 7, 8 are screwed, which can act on the action-side brake pad 4 via pressure pieces in order to displace it in the direction of the brake disc 2 during braking. This known pneumatically actuated disc brake also has an automatic adjustment device 9 to compensate for pad and disc wear.

Document DE 10 2004 037 771 A1 describes an example of such an adjustment device and its function.

To compensate for pad wear, the threaded pistons 7, 8 are provided with an external thread. In order to compensate for pad wear, the threaded pistons 7, 8 must be turned accordingly by means of the automatic adjustment device 9. As the adjustment device 9 is only arranged on one threaded piston 7 in the disc brake 1 with two threaded pistons 7, 8, it is necessary to rotate the second threaded piston 8 with the aid of a transmission element, which is referred to below as synchronizing element 13, and a so-called driver device 10.

The adjustment device 9 acts here in a rotating manner on the first threaded piston 7 in order to change the length of this nut and spindle arrangement by means of a relative screw connection between the threaded piston 7 and the cross-member 6, whereby the overall length of the clamping device between the brake pad and the abutment of the clamping device on the inside of the clamping section 3*a* of the brake caliper 3 is increased, which in turn compensates for the increasing pad wear.

The two threaded pistons 7 and 8 shown in FIG. 1 are coupled via the synchronization mechanism 12, which transmits a rotation of a shaft of the adjustment device 9, which is coupled to the first threaded piston 7, about an adjuster axis 9*a* to a shaft with a driver axis 10*a* of the driver device 10, which is coupled to the second threaded piston 8. The adjuster axis 9*a* and the driver axis 10*a* extend in parallel.

The synchronization mechanism 12 here comprises a synchronizing element 13 and two synchronizing wheels 14, 15. The synchronizing element 13 is a chain or roller chain or a toothed belt and interacts with the synchronizing wheels 14, 15 as a wrap-around gear. In the example shown, the synchronizing wheels 14, 15 are chain wheels, of which a first synchronizing wheel 14 is coupled to the first threaded piston 7 in a rotationally fixed manner. A second synchronizing wheel 15 is connected to the shaft of the driver device 10 and thus to the other threaded piston 8 in a rotationally fixed manner.

The disc brake 1 is designed in such a way that the roller chain is arranged as a synchronizing element 13 outside the clamping section 3*a* of the caliper 3 on an end face 18 of a wall of the clamping section 3*a*. The synchronizing element 13 including the synchronizing wheels 14, 15 and the areas around the synchronizing wheels 14, 15 is arranged inside a separate, sealed cover 16. This is illustrated in FIG. 4. The roller chain as synchronizing element 13 is arranged on both sides of an imaginary connecting line of the adjuster axis 9*a* and the driver axis 10*a*.

The document EP 0 566 008 A1 illustrates an air-operated disc brake.

There are essentially two embodiment variants of the pneumatically actuated disc brake 1 with regard to the brake cylinder arrangement.

The brake cylinder 17 is attached, e.g. screwed, to a flange section 3*b* of the clamping section 3*a* of the brake caliper 3 and is operatively connected to the brake rotary lever 11 by its plunger. The brake rotary lever 11 is surrounded by a lever housing 3*c*, which in this case is a component of the clamping section 3*a* of the brake caliper 3.

The first variant is the so-called axial brake (FIG. 2). This refers to the alignment of the brake cylinder 17 to the brake disc axis 2*a* of the brake disc 2. In the axial design, the operating direction of the brake cylinder 17 is largely parallel to the brake disc axis 2*a* of the brake disc 2.

The second variant is the so-called radial brake (FIG. 3). In this radial brake, the operating direction of the brake cylinder 17 is largely perpendicular or radial to the brake disc axis 2*a* of the brake disc 2.

Another design feature of the disc brakes 1 mentioned here is the design of the brake caliper 3 as a so-called monobloc caliper. This means that the brake caliper 3 (sliding caliper) consists of a single cast part. This design makes it possible on the one hand to increase robustness, strength and rigidity and on the other hand to reduce manufacturing costs.

However, the monobloc design of the brake caliper 3 cannot be represented with the radial brake and the previous arrangement of the roller chain as the synchronizing element 13 of the synchronization mechanism 12. This proves to be disadvantageous. In order to ensure that the brake rotary lever 11 can move freely, the arrangement of the roller chain means that the brake rotary lever 11 must be cranked out to such an extent that the brake rotary lever 11 has a very protruding, swan-neck-like shape. This solution is shown in FIG. 5, where it is also seen as a disadvantage that the weight of the brake rotary lever 11 is also very unfavorably influenced by this. A particular disadvantage, however, is that due to this protruding shape of the brake rotary lever 11, it is no longer possible to insert the brake rotary lever 11 into the clamping section 3*a* via an opening in the brake caliper 3 in the monobloc caliper version, in contrast to the brake caliper 3 of the axial brake. This opening in the brake caliper 3 is an opening in the clamping section 3*a*, which faces the brake disc 2 and is closed by a so-called base plate B. The threaded pistons 7, 8 extend through this base plate B parallel to the brake disc axis 2*a* towards the brake disc 2 (see FIG. 1). This is also referred to as the base plate interface.

It is therefore not possible to design brake caliper 3 (radial caliper) of the radial brake as a monobloc caliper. The current radial brake therefore consists of three cast parts, which have to be bolted together with relatively complex interfaces. The tightness and strength of the interfaces can only be guaranteed with relatively great effort. This is seen as particularly disadvantageous.

The object of the invention is therefore to create an improved disc brake with an improved synchronization mechanism for the threaded pistons of the adjustment mechanism, which also allows the brake caliper of the radial brake to be designed as a monobloc caliper.

The aim of the invention is to solve this object.

The invention solves this object by means of the subject matter of the independent claims.

A disc brake according to the invention, in particular for a motor vehicle, comprises a brake caliper which has a clamping section in which a clamping device with a brake rotary lever, at least two threaded pistons, an adjustment device and a driver device are arranged, and a synchronization mechanism for synchronizing the rotational movements of the threaded pistons, wherein the synchronization mechanism is arranged outside the housing of the brake caliper within a sealed cover on the clamping section of the brake caliper, and the synchronization mechanism has at least one synchronizing element and two synchronizing wheels, a first synchronizing wheel of which is coupled to one threaded piston and a second synchronizing wheel is coupled to the other threaded piston. The synchronization mechanism is arranged on the clamping section of the brake caliper so as to be guided about a lever housing of the brake rotary lever, which lever housing protrudes from the clamping section of the brake caliper.

Due to the arrangement of the synchronization mechanism for the adjusting screw spindles according to the invention, it is advantageously possible to design the brake rotary lever in such a way that it can be mounted via the opening for the base plate in the same way as with the axial brake.

Another significant advantage is that the brake rotary lever is as simple and compact as possible because the synchronization mechanism is routed around the lever.

Furthermore, it is advantageously achieved that due to restrictions regarding the installation of the brake in the vehicle, the synchronization mechanism is arranged in such a way that the permissible installation space for the brake is not exceeded.

The synchronization mechanism is therefore advantageously arranged so that it is located outside the wheel rim and on the side of the brake caliper housing facing away from the axle beam of the vehicle.

Further advantageous embodiments can be found in the other dependent claims.

In one embodiment, the brake caliper has a balcony-like support section which is attached or integrally formed laterally to the clamping section and which protrudes from the clamping section of the brake caliper in the direction of a brake disc axis, wherein an upper side of the support section extends in a common plane together with an end face of the clamping section. This advantageously increases the surface area in order to arrange the synchronization mechanism around the lever housing in a simple manner.

This is particularly advantageous if the support section is an additional cast contour of the clamping section of the brake caliper, as this eliminates the need for additional assembly work to attach the support section.

One embodiment provides that the at least one synchronizing element of the synchronization mechanism is a chain or roller chain or a toothed belt and interacts with the synchronizing wheels as a wrap-around gear, wherein the synchronization mechanism is arranged inside the sealed cover on the clamping section and on the support section of the brake caliper. A chain is a robust, cost-effective component and can be obtained on the market in high quality. This also applies to a toothed belt.

It is advantageous that the at least one synchronizing element is arranged around the lever housing of the brake rotary lever with the aid of a chain guide.

In one embodiment, the chain guide has guide elements in the form of cylindrical domes, deflection rollers and/or guide rails. This is an advantageous way of enabling low-friction guidance.

In a further embodiment, a course of the at least one synchronizing element around the lever housing of the brake rotary lever is a component of an imaginary trapezoidal shape, wherein the course of the synchronizing element is arranged in an area of slanted edges of the support section, which form components of the legs of the imaginary trapezoid, and of a straight edge of the support section, which is the short base side of the imaginary trapezoid. This arrangement is advantageously space-saving.

An alternative embodiment provides that the at least one synchronizing element of the synchronization mechanism is formed from a number of synchronizing gears and interacts with the synchronizing wheels as a spur gear, wherein the synchronization mechanism is arranged within the sealed cover on the clamping section and on the support section of the brake caliper. This is advantageous as transmission losses are hardly influenced by the size of the deflection. The low-cost gears, which are available in high quality at low cost, are also advantageous. Assembly is also simple.

In another alternative embodiment, the at least one synchronizing element of the synchronization mechanism is formed from a number of synchronizing shafts which are coupled to each other and to the synchronizing wheels via coupling units which are attached to the ends of the synchronizing shafts. The advantage here is a low number of parts and simple installation.

Furthermore, in one embodiment it is advantageous if the coupling units have bevel gears, wherein the synchronizing gears are crown gears with bevel teeth. These components are inexpensive.

In an alternative embodiment, the coupling units can have universal joints, constant velocity joints or elastic coupling elements. These components are also available on the market in high quality and at low cost.

In another embodiment, an advantageous reduction in the number of parts is offered if the at least one synchronizing element of the synchronization mechanism is formed from one or more flexible shafts.

In a particularly preferred embodiment, the brake caliper is formed in one piece with the support section as a monobloc caliper. This has the particular advantage of being simple and inexpensive to install. Another important advantage here is that the monobloc design enables a reduction in weight by saving casting weight.

In another preferred embodiment, the disc brake is actuated by compressed air. This is advantageous as this design is reliable and robust.

Compared to the previous prior art, the invention thus makes it possible to realize a so-called monobloc caliper as a brake caliper with the following advantages:

- Significant cost savings (fewer cast parts, avoidance of interfaces).
- Improved robustness and reliability by avoiding bolted and sealed interfaces in the area of the brake caliper housing.
- Simplified and cheaper installation.
- Weight reduction through savings in cast weight due to the monobloc design.
- Reduced load and thus increased robustness of the brake caliper bearing due to the reduced brake caliper weight.
- More favorable installation conditions in the vehicle due to the more compact design of the brake caliper.

Exemplary embodiments of the invention are described below with reference to the accompanying drawings. These exemplary embodiments merely serve to illustrate the invention by means of preferred constructions, which, however, do not conclusively represent the invention. In this respect, other exemplary embodiments as well as modifications and equivalents of the illustrated exemplary embodiments can also be realized within the scope of the claims.

The invention will now be explained in more detail by means of exemplary embodiments with reference to the accompanying drawings.

DETAILED DESCRIPTION OF THE DRAWINGS

FIGS. 1 to 5 from the prior art have already been described above.

Figure 6:
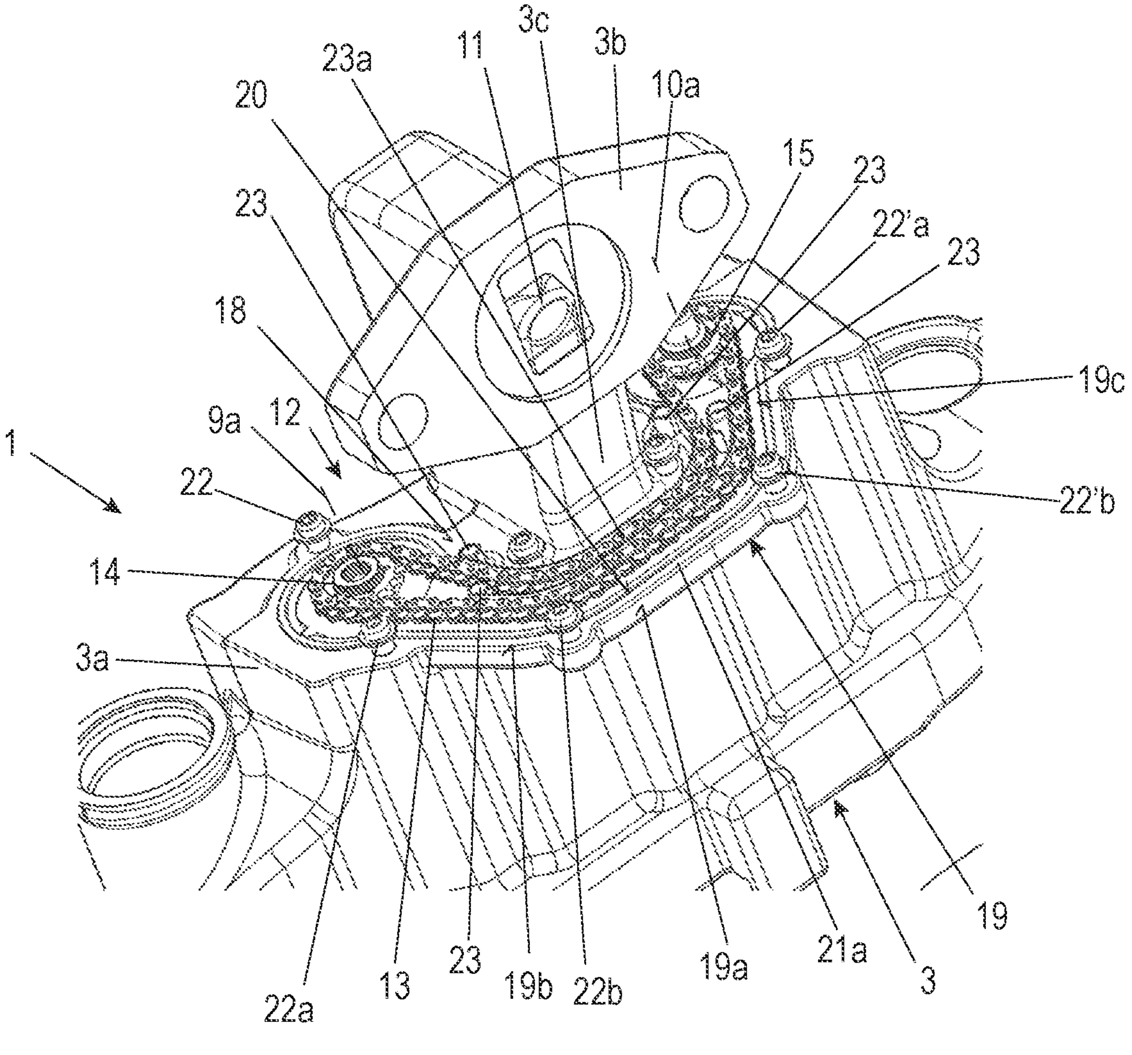
FIG. 6 shows a schematic perspective view of an exemplary embodiment of a disc brake according to the invention with a synchronization mechanism according to an embodiment of the invention.
Figure 7:
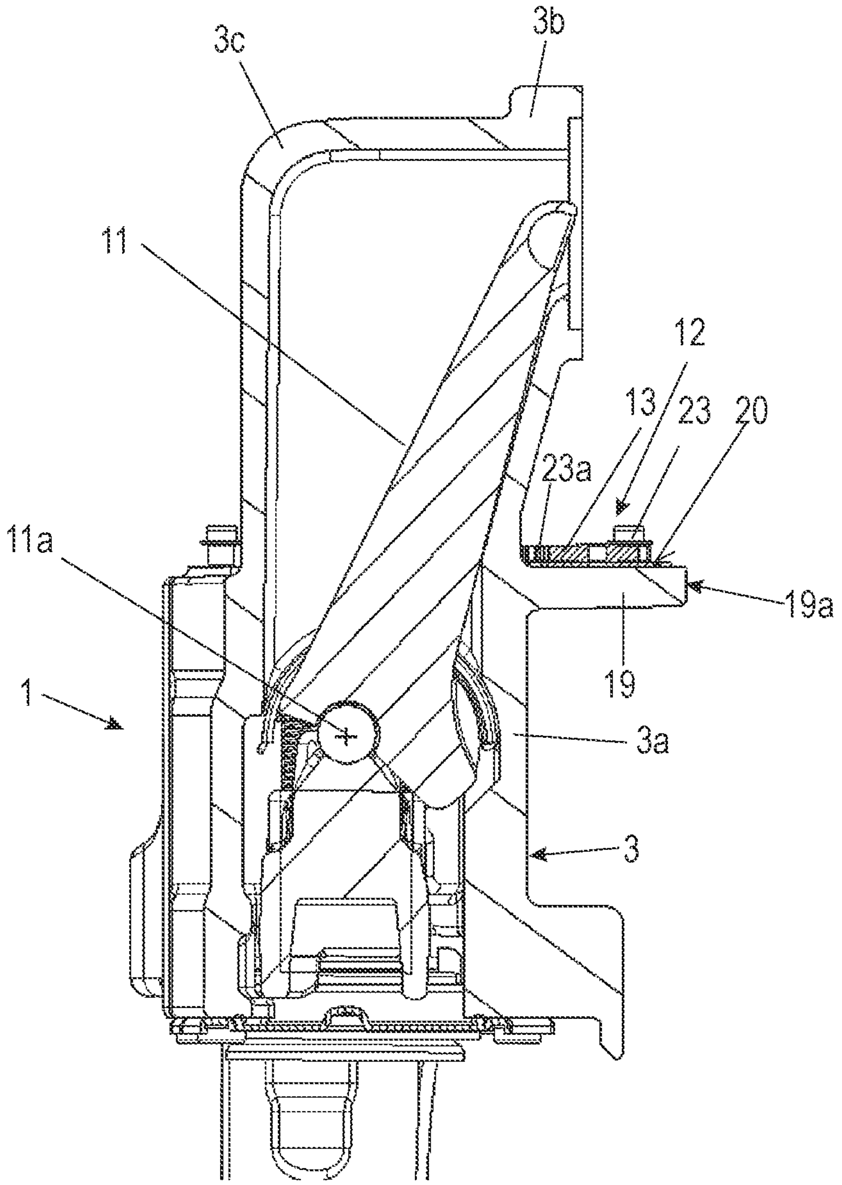
FIG. 7 shows an enlarged sectional view of a lever housing of a brake caliper of the exemplary embodiment according to FIG. 6.
Figure 8:
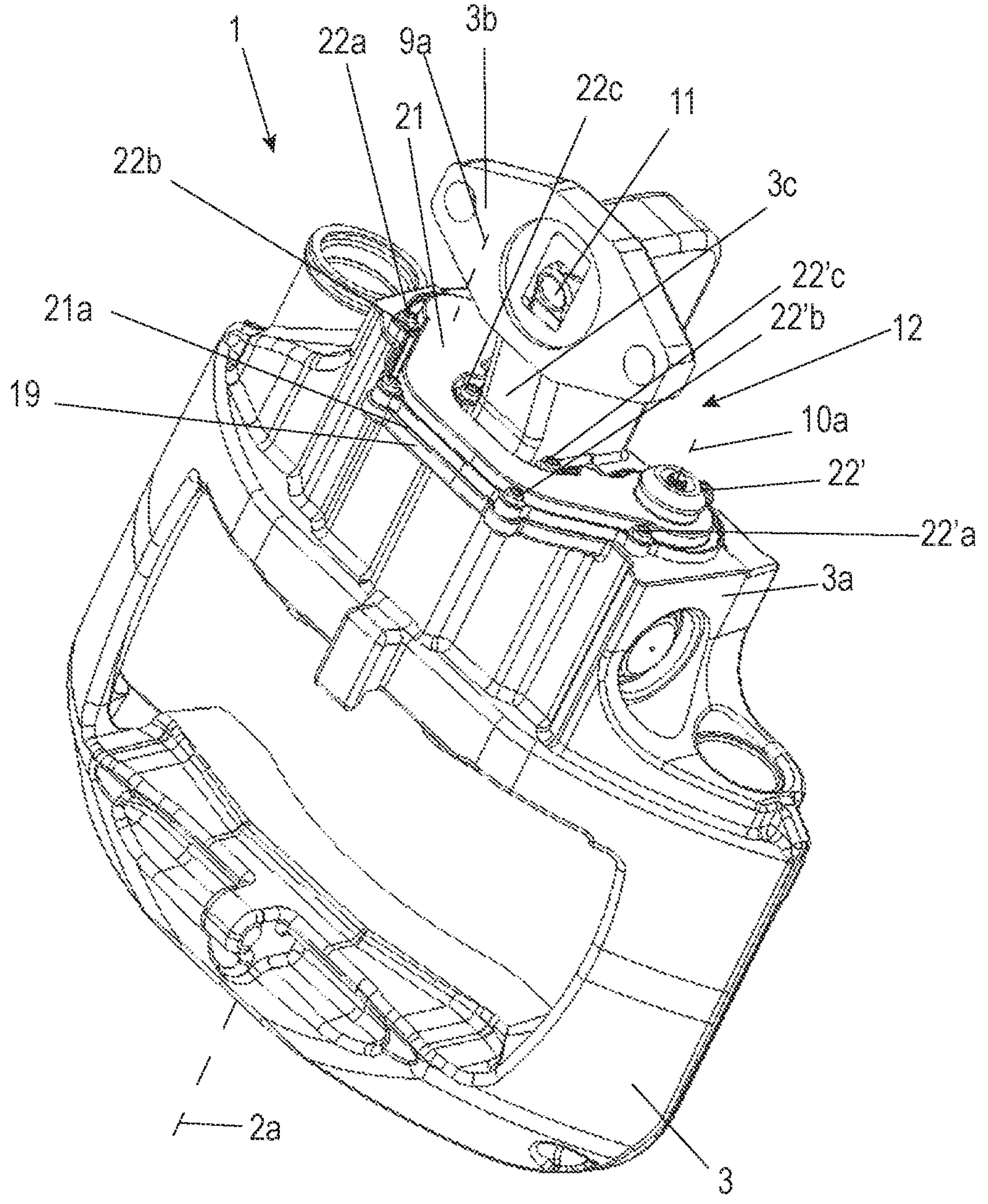
FIG. 8 shows a schematic perspective view of the exemplary embodiment of the disc brake according to the invention as shown in FIG. 6.

FIG. 6 shows a schematic perspective view of a synchronization mechanism 12 of the exemplary embodiment according to FIG. 6. FIG. 7 shows an enlarged sectional view of a lever housing 3*c* of a brake caliper 3 of the exemplary embodiment of the disc brake 1 according to the invention according to FIG. 6. FIG. 8 shows a schematic perspective view of an exemplary embodiment of a disc brake 1 according to the invention in a top view.

As shown in FIG. 6, the lever housing 3*c* of the brake rotary lever 11 of the radial brake, i.e. disc brake 1, protrudes in the direction of the brake disc axis 2*a* from the clamping section 3*a* of the brake caliper 3. The lever housing 3*c* is arranged in the middle of the end face 18 of the clamping section 3*a* between the adjuster axis 9*a* and the driver axis 10*a*.

The brake rotary lever 11 is arranged in the lever housing 3*c*. In FIG. 6, the end of the lever arm of the brake rotary lever 11 can be seen inside an opening of the flange section 3*b*. This end of the lever arm interacts with the plunger of the brake cylinder 17 to be attached to the flange section 3*b*.

To ensure that the design of the rotary brake rotary lever 11 is as simple and compact as possible, the transmission mechanism of the synchronization mechanism 12 must be routed around the brake rotary lever 11 and its lever housing 3*c*. On the other hand, due to restrictions regarding the installation of the disc brake in a vehicle, the synchronization mechanism 12 must be arranged in such a way that the permissible installation space for the disc brake 1 in the vehicle is not exceeded.

The synchronization mechanism 12 is therefore arranged so that it is located outside the wheel rim and on the side of the caliper housing of the brake caliper 3 facing away from the axle beam of the vehicle.

Guiding the synchronization mechanism 12 around the lever housing 3*c* requires an extension of a surface of the end face 18. For this purpose, the brake caliper 3 has a balcony-like support section 19 attached to the side of the clamping section 3*a*. This support section 19 protrudes from the clamping section 3*a* of the brake caliper 3 in the direction of the brake disc axis 2*a*.

An upper side 20 of the support section 19 extends in a common plane together with the end face 18 of the clamping section 3*a* and forms an extension to it.

The support section 19 also serves to support a cover 21, which protects the synchronization mechanism. Sealing of the cover 21 is made possible by a cover seal 21*a*, which is inserted or applied in a suitable manner, e.g. in matching contours, in the edge region of the upper side 20 of the support section 19 and on the end face 18 of the clamping section 3*a*.

The support section 19 can, for example, be an additional cast contour of the clamping section 3*a* of the brake caliper 3.

To this end, FIG. 7 shows an enlarged sectional view of the lever housing 3*c* of the brake caliper 3 of the exemplary embodiment according to FIG. 6. The brake rotary lever 11 with its lever arm and its end are arranged in a slender shape in the lever housing 3*c*. The brake rotary lever 11 can be rotated about a rotary lever axis 11*a*, which here extends at an angle of 90° to the brake disc axis 2*a*.

The support section 19 is formed in one piece with the clamping section 3*a* of the brake caliper 3.

The support section 19 can be arranged on the edge of the clamping section 3*a* along the entire length of the edge or over a shorter length. Different geometric shapes of the support section 19 are possible. For example, FIG. 6 shows a trapezoidal shape, FIG. 9 curved sections with different radii and straight extensions. Rectangular shapes are also conceivable. The edges of these shapes are provided with partially cylindrical domes, which are used to attach the fastening elements 22 of the cover 21. It is understood that other edge shapes are also possible.

FIG. 8 shows the brake caliper 3 as a monobloc caliper. The synchronization mechanism 12 is closed with the cover 21. The cover 21 is fastened to the support section 19 at its circumferential edge with fastening elements 22, 22*a*, 22*b*, 22*c* and 22', 22'*a*, 22'*b*, 22'*c*, e.g. screws. In the example shown, the cover 21 and the synchronization mechanism 12 are symmetrical with respect to an axis of symmetry which extends parallel to the brake disc axis 2*a* through the center of an imaginary connecting line of adjuster axis 9*a* and driver axis 10*a*.

Figure 1:
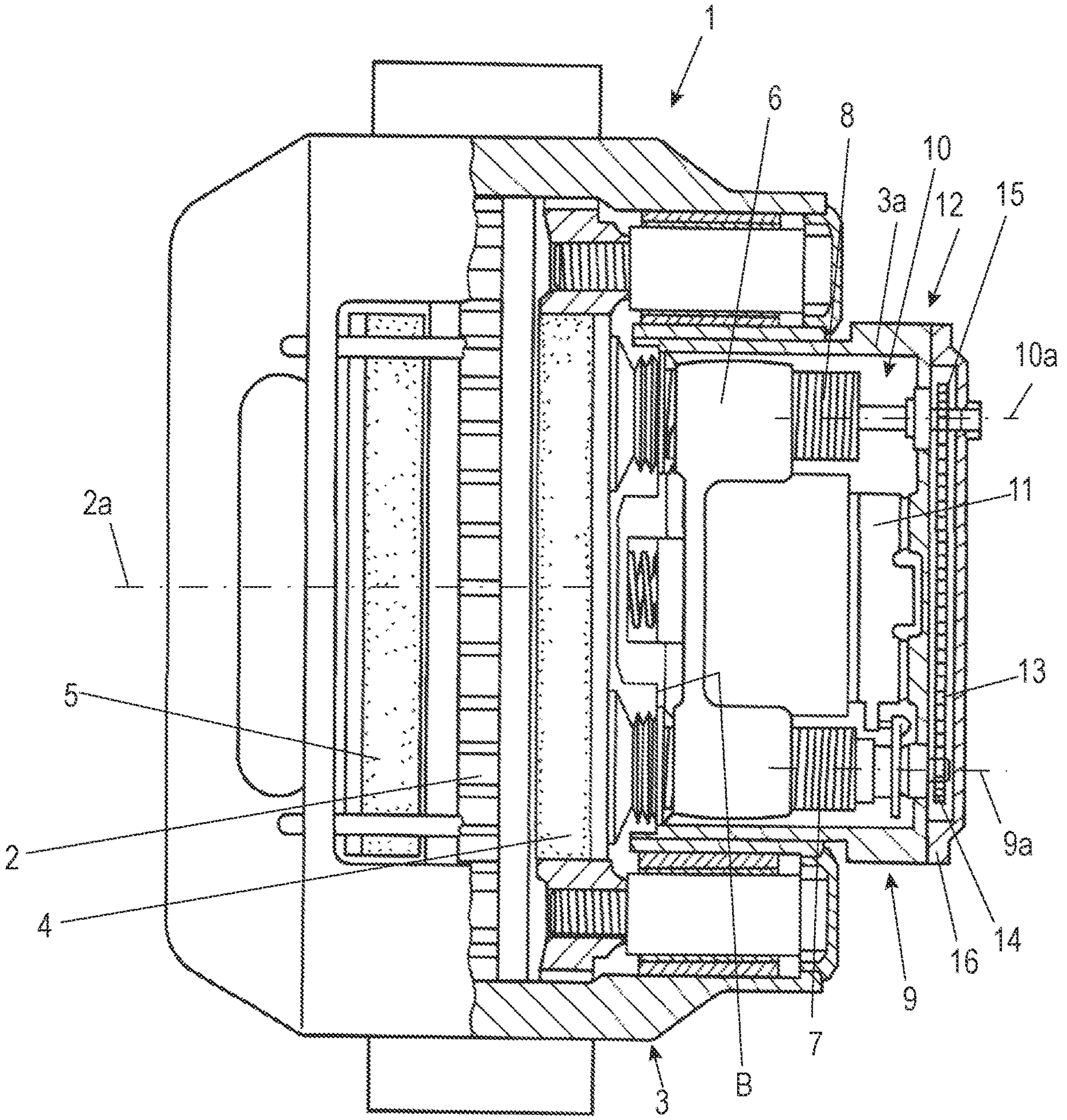
Fig. 1 Prior art
FIG. 1 shows a schematic sectional view of a disc brake from the prior art.
Figure 2:
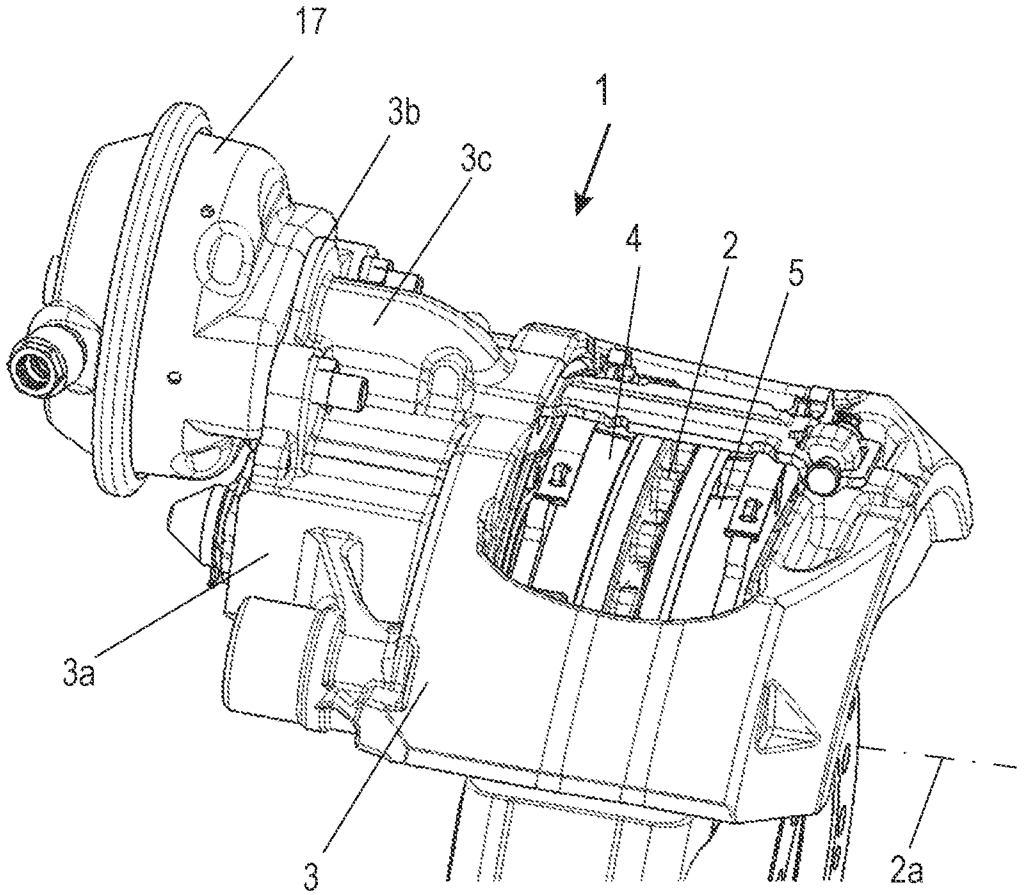
Fig. 2 Prior art
FIGS. 2-3 show schematic perspective views of embodiment variants of disc brakes from the prior art.
Figure 3:
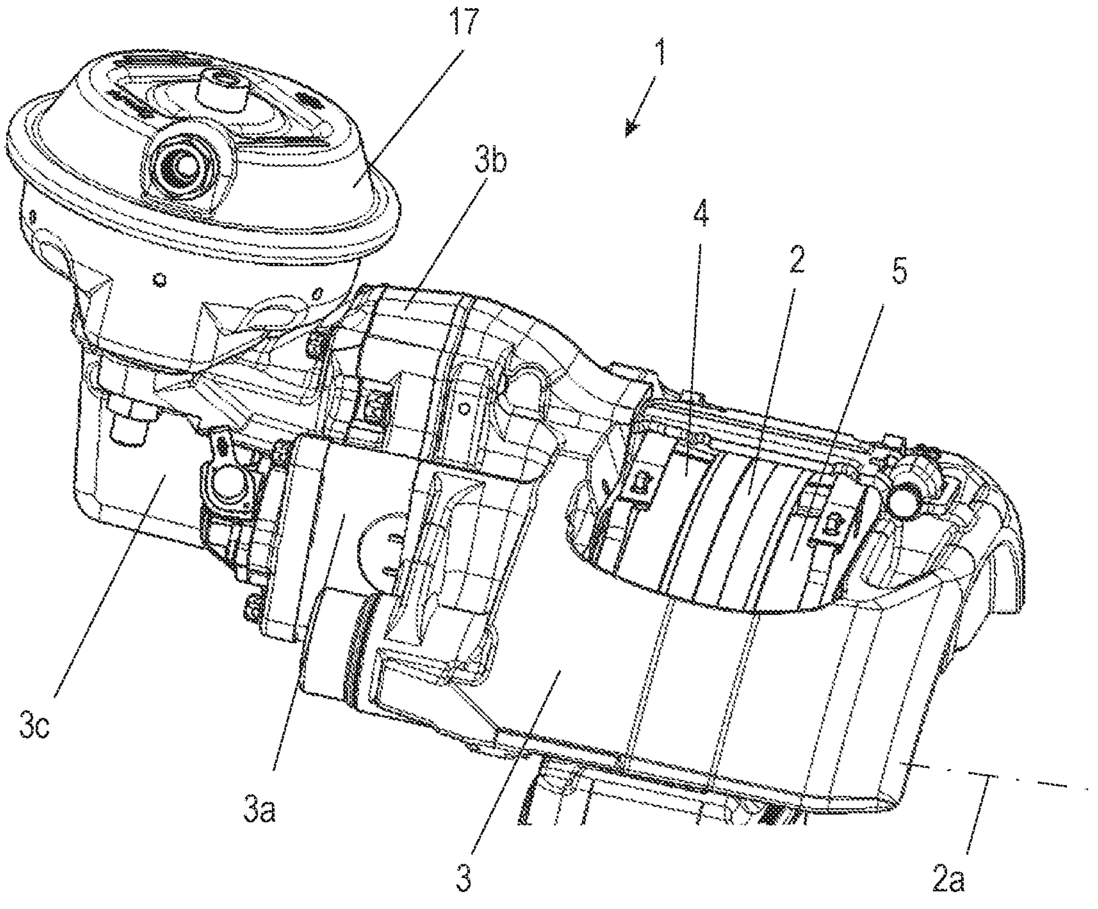
Fig. 3 Prior art
Figure 4:
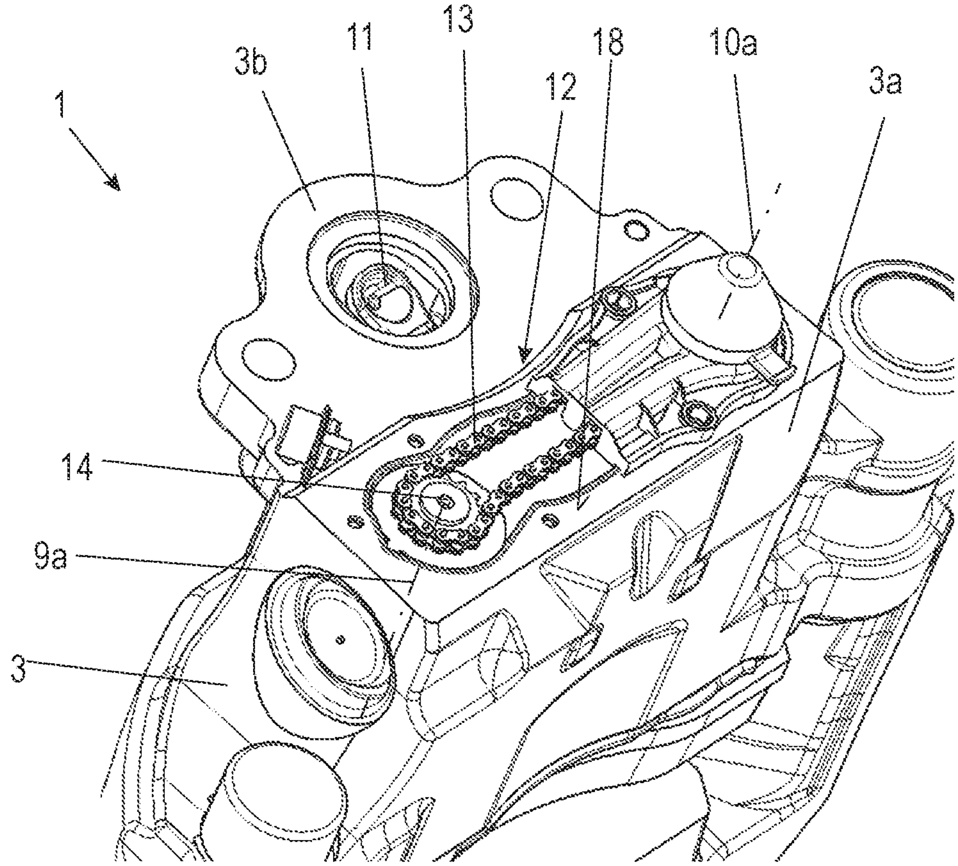
Fig. 4 Prior art
FIGS. 4-5 show schematic views of conventional synchronization mechanisms of disc brakes from the prior art.
Figure 5:
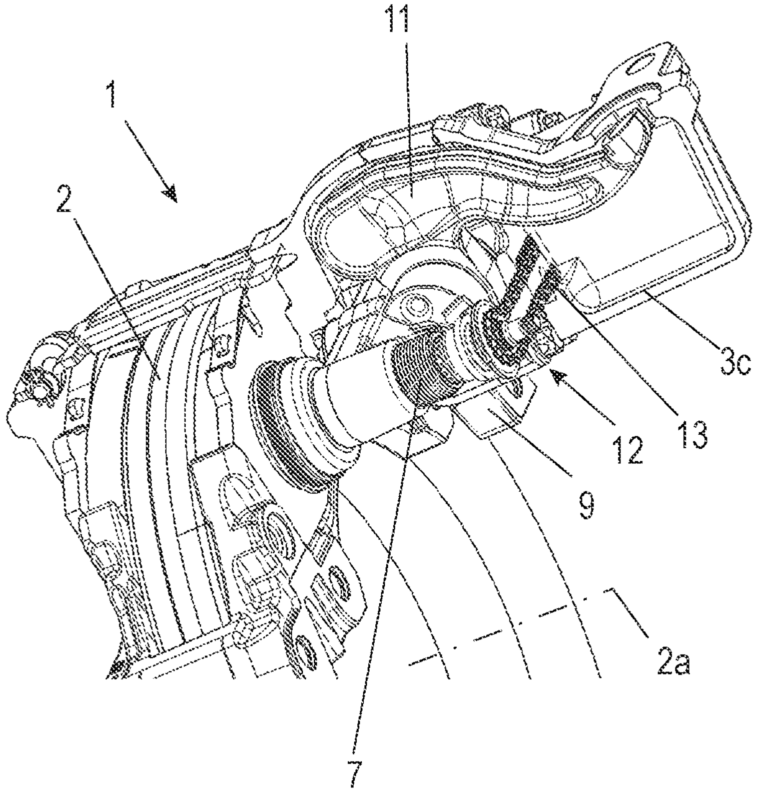
Fig. 5 Prior art

As with the axial brake (see FIG. 4) and as a transmission element, a roller chain serves as a synchronizing element 13. The threaded pistons 7, 8 (see FIG. 1) are indicated in FIG. 5 and in the other figures by the adjuster axis 9*a* and the driver axis 10*a*. In this case, the two threaded pistons 7, 8 cannot be coupled directly to the roller chain. The term "direct path" is to be understood as an imaginary straight line between the axes 9*a* and 10*a*, which is "blocked" here by the lever housing 3*c* protruding from the clamping section 3*a* of the brake caliper 3.

Due to the conditions described above, the synchronizing element 13 (chain) must be guided around the lever with the aid of a chain guide. This chain guide has guide elements 23, 23*a* in the form of cylindrical domes and guide rails.

A course of the synchronizing element 13 on the end face 18 of the clamping section 3*a* and the upper side of the support section 19 around the lever housing 3*c* can be described as part of an imaginary trapezoidal shape. This imaginary trapezoid is formed by a long base side between the adjuster axis 9*a* and the driver axis 10*a*. The shorter base side extends parallel to this as the free edge 19*a* of the support section 19. The legs of the imaginary trapezoid are formed from the slanted edges 19*b*, 19*c* of the support section 19.

In this case, the course of the synchronizing element 13 is arranged in the area of the slanted edges 19*b*, 19*c* and the straight edge 19*a*.

It is important here that the chain is guided as a synchronizing element 13 with as little friction as possible so that the transmission losses caused by the friction of the chain at the deflection points of the domes are not too great. The larger the deflection angles, the greater the transmission losses can be. The relationship can be described using the rope friction equation.

$$F_1 = F_2 * e^{\Phi\mu}$$

Wherein:

$F_1$: Tensile force on the chain after deflection $F_2$: Tensile force on the chain before the deflection $\Phi$: Deflection angle $\mu$: Coefficient of friction To minimize transmission losses, the chain can also be deflected using deflection rollers. However, the applicability of this solution depends on the available installation space.

Instead of a roller chain, a toothed belt can also be used as synchronizing element 13. This is not shown, but is easily understood. In this case, the synchronizing wheels 14, 15 are correspondingly designed as toothed belt wheels.

Figure 9:
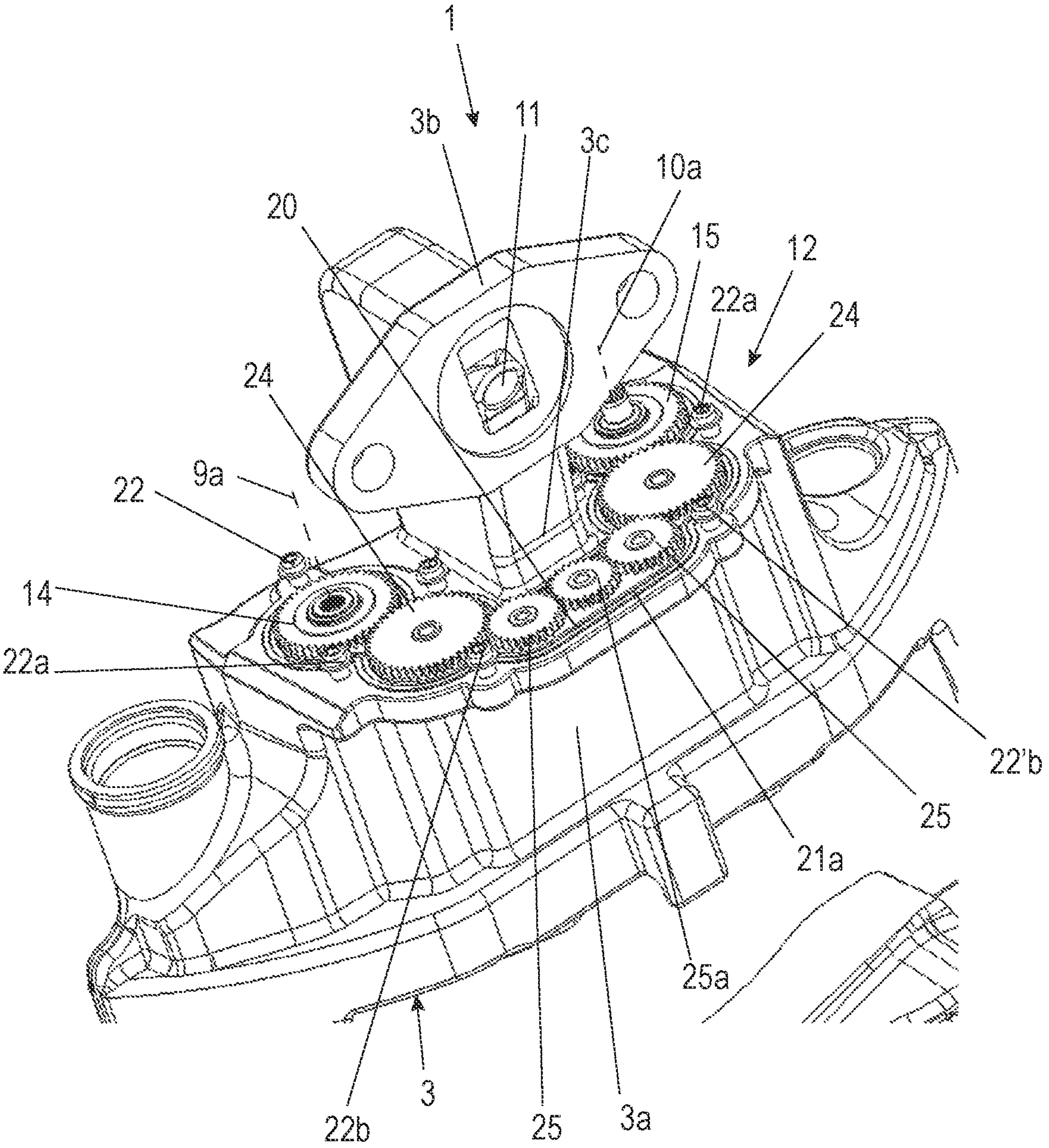
FIGS. 9-10 show schematic perspective views of variants of the exemplary embodiment shown in FIG. 6.

FIG. 9 shows a schematic perspective view of a first variant of the exemplary embodiment shown in FIG. 6.

In this first variant, a number of synchronizing gears 24, 25, 25*a*, e.g. spur gears, are used as the synchronizing element 13. In the example shown in FIG. 9, the synchronization mechanism 12 comprises five synchronizing gears 24, 25, 25*a* and two synchronizing wheels 14, 15.

The synchronizing wheels 14, 15 are designed here as spur gears and are each in mesh with a first synchronizing gear 24. These first synchronizing gears 24 are each in mesh with a second synchronizing wheel 25, which in turn are both in mesh with a common synchronizing wheel 25*a*. An odd number of synchronizing gears 24, 25, 25*a* is required in order to obtain the same direction of rotation of the threaded pistons 7, 8, otherwise the thread of one of the threaded pistons 7, 8 would have to be a left-hand thread.

In contrast to the synchronizing element 13 as a roller chain, the transmission losses in this variant are hardly influenced by the size of the deflection, i.e. by the angle between the sides of the imaginary trapezoid. The transmission losses are mainly determined by the number of synchronizing gears 24, 25, 25*a*.

Figure 10:
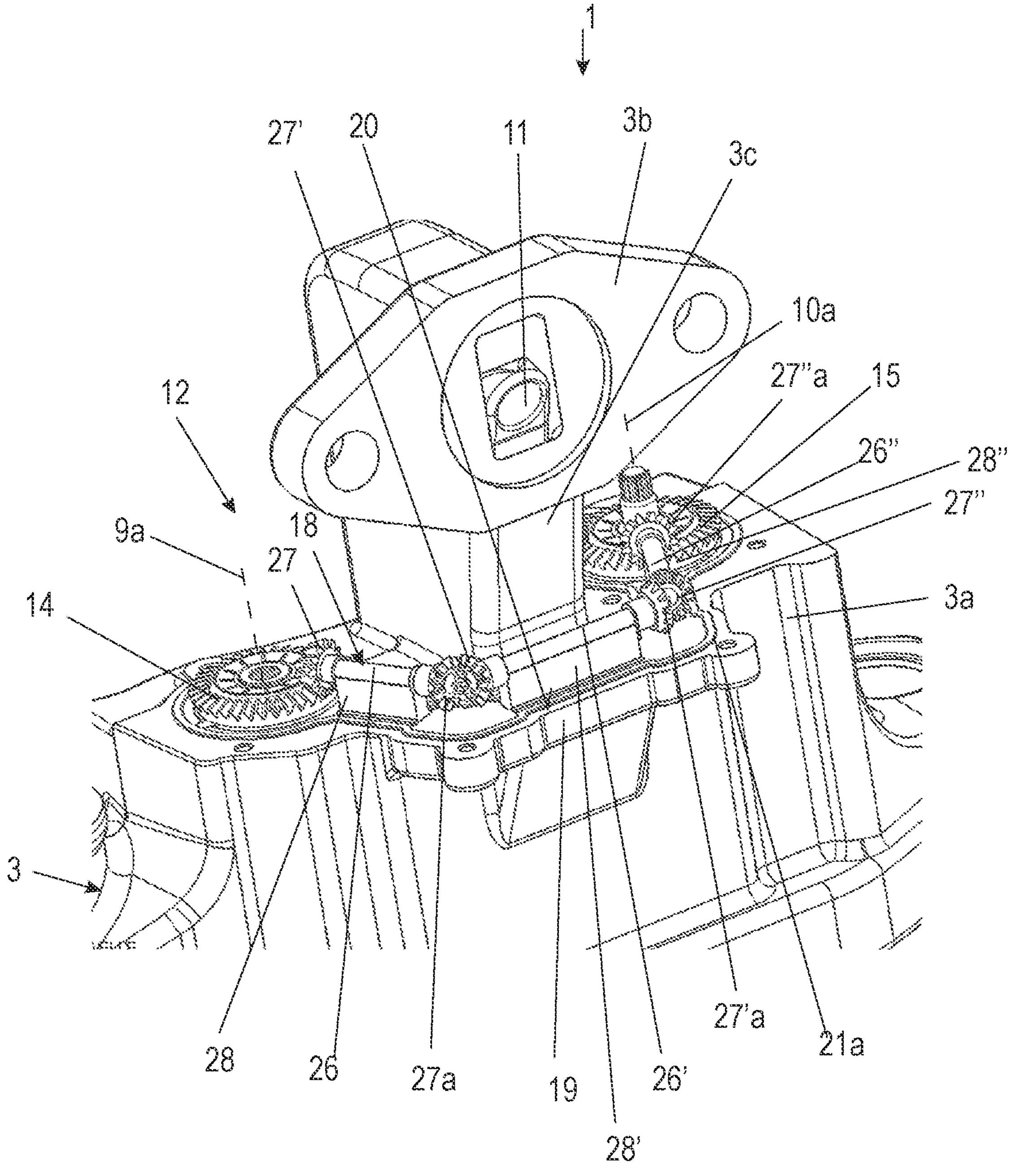

In a second variant of the exemplary embodiment according to FIG. 6, which is shown in a schematic perspective view in FIG. 10, shafts are used as synchronizing elements or transmission elements, which are designated here as synchronizing shafts 26, 26', 26".

In the example shown, the synchronization mechanism 12 comprises three synchronizing shafts 26, 26', 26", four coupling units and two synchronizing wheels 14, 15.

The synchronizing shafts 26, 26', 26" are coupled to each other and to the synchronizing wheels 14, 15 via the coupling units with bevel gears or also other coupling elements (e.g. universal joints, constant velocity joints or elastic coupling elements), which are each attached to the ends of the synchronizing shafts 26, 26', 26".

The synchronizing shafts 26, 26', 26" are each attached to the end face 18 of the clamping section 3*a* and the upper side 20 of the support section 19 via a bearing 28, 28', 28" not described in detail.

In this variant, the arrangement of the three synchronizing shafts 26, 26', 26" is such that two synchronizing shafts 26, 26", which are each coupled to a synchronizing wheel 14, 15, extend in the inclined sides of an imaginary trapezoid. One synchronizing shaft 26', which is coupled to the two other synchronizing shafts 26, 26", extends in the short base side of the imaginary trapezoid.

In this variant, the synchronizing wheels 14, 15 are designed as crown bevel gears. Accordingly, coupling wheels 27, 27*a*; 27', 27'*a*; 27", 27"*a* of the synchronizing shafts 26, 26', 26" are designed as bevel gears. The synchronizing wheels 14, 15 are bevel gears with bevel teeth.

The first synchronizing wheel 14 is in mesh with a coupling wheel 27 of the first synchronizing shaft 26. The other coupling wheel 27*a* of the first synchronizing shaft 26 and a coupling wheel 27' of the second synchronizing shaft 26' form the coupling of the synchronizing shafts 26 and 26'. Similarly, the second synchronizing shaft 26' and the third synchronizing shaft 26" are coupled via their coupling wheels 27'*a* and 27". The other coupling wheel 27"*a* is in mesh with the second synchronizing wheel 15.

It is also contemplated to transmit the rotational movements of the threaded pistons 7, 8 by means of the synchronization mechanism with one or more flexible shafts.

The invention is not limited by the exemplary embodiments described above. It can be modified within the scope of the appended claims.

The course of the synchronizing element 13 as a chain can be designed as an arc shape with one radius or an arc shape consisting of several arcs with different radii. In this case, however, the dimension of the protrusion of the edge of the support section 19 from the clamping section 3*a* of the brake caliper 3 must be taken into account, as this may result in larger installation dimensions of the disc brake 1.

LIST OF REFERENCE SIGNS

1 Disc brake
2 Brake disc
2*a* Brake disc axis
3 Brake caliper
3*a* Clamping section
3*b* Flange section
3*c* Lever housing
4, 5 Brake pad
6 Cross-member
7, 8 Threaded piston
9 Adjustment device
9*a* Adjuster axis
10 Driver device
10*a* Driver axis
11 Brake rotary lever
11*a* Rotary lever axis
12 Synchronization mechanism
13 Synchronizing element
14, 15 Synchronizing wheel
16 Cover
17 Brake cylinder
18 End face
19 Support section
19*a*, 19*b*, 19*c* Edge
20 Upper side
21 Cover
21*a* Cover seal
22, 22*a*, 22*b*; 22', 22'*a*, 22'*b* Fastening element
23, 23*a* Guide element
24, 25 Synchronizing gear
26, 26', 26" Synchronizing shaft
27, 27, 27"; 27*a*, 27'*a*, 27"*a* Coupling wheel
28, 28', 28" Bearing
B Base plate

The invention claimed is:

1. A disc brake for a motor vehicle, comprising:
a brake caliper having a clamping section housing in which a clamping device with a brake rotary lever, at least two threaded pistons, an adjustment device, and a driver device are arranged; and
a synchronization mechanism for synchronizing rotational movements of the at least two threaded pistons, wherein the synchronization mechanism is arranged outside the housing within a sealed cover,
wherein the synchronization mechanism comprises:
at least one synchronizing element and two synchronizing wheels, the two synchronizing wheels being respectively connected to the two threaded pistons in a rotationally fixed manner, and
wherein the synchronization mechanism is arranged on the clamping section housing of the brake caliper so as to be guided about a lever housing of the brake rotary lever, which lever housing protrudes from the clamping section housing of the brake caliper.

2. The disc brake according to claim 1, wherein
the brake caliper has a balcony-shaped support section which is attached or integrally formed laterally to the clamping section housing,
the support section protrudes from the clamping section housing of the brake caliper in a direction orthogonal to a brake disc axis, wherein an upper side of the support section extends in a common plane together with an end face of the clamping section housing.

3. The disc brake according to claim 2, wherein
the support section is an additional cast contour of the clamping section housing of the brake caliper.

4. The disc brake according to claim 2, wherein
the at least one synchronizing element of the synchronizing mechanism is a chain, a roller chain, or a toothed belt, and interacts with the two synchronizing wheels as a wrap-around gear, and
the synchronizing mechanism is arranged inside the sealed cover on the clamping section housing and on the support section of the brake caliper.

5. The disc brake according to claim 4, wherein
the at least one synchronizing element is arranged around the lever housing of the brake rotary lever with the aid of a chain guide.

6. The disc brake according to claim 5, wherein
the chain guide has guide elements in the form of cylindrical domes, deflection rollers and/or guide rails.

7. The disc brake according to claim 2, wherein
a course of the at least one synchronizing element around the lever housing of the brake rotary lever is a component of an imaginary trapezoidal shape,
the course of the synchronizing element is arranged in an area of slanted edges of the support section, which form components of legs of the imaginary trapezoid, and of a straight edge of the support section, which is a short base side of the imaginary trapezoid.

8. The disc brake according to claim 2, wherein
the at least one synchronizing element of the synchronizing mechanism is formed from a number of synchronizing gears, and interacts with the two synchronizing wheels that form spur gears,
the synchronizing mechanism is arranged within the sealed cover on the clamping section housing and on the support section of the brake caliper.

9. The disc brake according to claim 2, wherein
the at least one synchronizing element of the synchronization mechanism is formed from a number of synchronizing shafts which are coupled to one another and to the two synchronizing wheels via coupling units which are attached, in each case, to ends of the synchronizing shafts.

10. The disc brake according to claim 9, wherein
the coupling units have bevel gears, and
the two synchronizing gears are crown gears with bevel teeth.

11. The disc brake according to claim 9, wherein
the coupling units have universal joints, constant velocity joints, or elastic coupling elements.

12. The disc brake according to claim 2, wherein
the at least one synchronizing element of the synchronization mechanism is formed from one or more flexible shafts.

13. The disc brake according to claim 1, wherein
the clamping section housing together with the support section is formed in one piece as a monobloc caliper.

14. The disc brake according to claim 1, wherein
the brake caliper together with the support section is formed in one piece as a monobloc caliper.

15. The disc brake according to claim 1, wherein
the disc brake is a compressed air actuated disc brake.

* * * * *